United States Patent [19]
Divine et al.

[11] Patent Number: 5,978,825
[45] Date of Patent: Nov. 2, 1999

[54] ZERO DETECTION CIRCUITRY AND METHODS

[75] Inventors: James Divine; Jeffrey Niehaus, both of Austin, Tex.

[73] Assignee: Crystal Semiconductor Corp., Austin, Tex.

[21] Appl. No.: 08/970,796

[22] Filed: Nov. 14, 1997

[51] Int. Cl.⁶ ................................. G06F 7/00; G06F 7/50
[52] U.S. Cl. ............................................................ 708/525
[58] Field of Search .......................... 364/736.5, 715.011, 364/768; 708/525, 200, 670

[56] References Cited

U.S. PATENT DOCUMENTS

| | | | |
|---|---|---|---|
| 5,270,955 | 12/1993 | Bosshart et al. | 364/736.5 |
| 5,561,619 | 10/1996 | Watanabe et al. | 364/736.5 |
| 5,581,496 | 12/1996 | Lai et al. | 364/736.5 |
| 5,586,069 | 12/1996 | Dockers | 364/736.5 |

*Primary Examiner*—David H. Malzahn
*Attorney, Agent, or Firm*—James J. Murphy; J. P. Violette

[57] ABSTRACT

A method of generating zero detect flag at the output of an adder adding a first vector and a second vector to generate a third vector. A fourth vector is generated from the third vector a carry propagation vector and a carry generation vector. A fifth vector generated using an incremented third vector and an incremented carry propagation vector. A sixth vector generated from the fourth vector and the fifth vector. The bits of the sixth vector bitwise added to obtain the zero detection flag.

8 Claims, 6 Drawing Sheets

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| SRCB |||| SRCA ||||||| DEST ||||||||

FIG. 8A

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| CC |||| SRCD |||||||||||||

FIG. 8B

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| SHFCTL ||||||||||| DEST ||||||||

FIG. 8C

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| SRCB* |||| SRCA ||||||| DEST* ||||||||

FIG. 8D

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| DESTB* |||| SRCD |||||||||||||

FIG. 8E

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| MVSRCB |||| ///////// ||||||| DEST ||||||||

FIG. 8F

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| OPCODE ||||| ///////////////////////////////////// |||||||||||||||||||

FIG. 8G

ZERO DETECTION CIRCUITRY AND METHODS

CROSS-REFERENCE TO RELATED APPLICATION

The following co-pending and co-assigned application contains related information and is hereby incorporated by reference: Ser. No. 08/970,979, entitled "DIGITAL AUDIO DECODING CIRCUITRY, METHODS AND SYSTEMS" filed Nov. 14, 1997;

Ser. No. 08/970,714, entitled "METHODS FOR BOOTING A MULTIPROCESSOR SYSTEM" filed Nov. 14, 1997;

Ser. No. 08/970,372, entitled "METHODS FOR DEBUGGING A MULTIPROCESSOR SYSTEM" filed Nov. 14, 1997;

Ser. No. 08/969,883, entitled "INTER-PROCESSOR COMMUNICATION CIRCUITRY AND METHODS" filed Nov. 14, 1997;

Ser. No. 08/969,884, entitled "METHODS FOR UTILIZING SHARED MEMORY IN A MULTIPROCESSOR SYSTEM" filed Nov. 14, 1997;

Ser. No. 08/970,841, entitled "A VOLTAGE CONTROLLED CRYSTAL OSCILLATOR" filed Nov. 14, 1997;

Ser. No. 08/971,080, entitled "METHOD FOR ERROR CONCEALMENT IN AN AUDIO DECODING SYSTEM" filed Nov. 14, 1997; and Ser. No. 08/970,302, entitled "METHODS FOR EXPONENT HANDLING IN AN AUDIO DECODING SYSTEM" filed Nov. 14, 1997.

BACKGROUND OF THE INVENTION

1. Field of the Invention

The present invention relates in general to audio data processing and in particular, to digital audio decoding circuitry and methods and systems using the same.

2. Description of the Related Art

The ability to process audio information has become increasingly important in the personal computer (PC) environment. Among other things, audio support is an important requirement for many multimedia applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability. Additionally, digital audio plays a significant role outside the traditional PC realm, such as in compact disk players, VCRs and televisions. As the audio technology progresses, digital applications are becoming increasingly sophisticated as improvements in sound quality and sound effects are sought.

One of the key components in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder must provide the proper hardware and software interfaces to communicate with the possible compressed (and decompressed) data sources, as well as the destination digital and/or audio devices. Since, there are a number of different audio compression/decompression formats and interface definitions, such as Dolby AC-3 and S/PDIF (Sony/Phillips Digital Interface), a state of the art digital audio decoder should at least be capable of supporting multiple compression/decompression formats. In addition, the decoder must have the proper interfaces required for overall control and debugging by a host microprocessor or microcontroller.

During the decompression of streaming compressed audio data, as well as during other decoder operations, arithmetic and logic operations must be continuously performed. In order to maximize overall system efficiency and data throughput, the speed at which the arithmetic and logic operations are performed also must be maximized. Thus, the need has arisen for methods for increasing the speed of arithmetic and logic operations in high speed applications, including audio decoders.

SUMMARY OF THE INVENTION

According to the principles of the present invention, a method of generating a zero detect flag at the output of an adder adding a first vector and a second vector to generate a third vector is disclosed. A fourth vector is generated from the third vector, a carry propagation vector and a carry generation vector. A fifth vector is generated using a second carry propagation vector and an iteration third vector. A sixth vector is generated from the fourth vector and the fifth vector. The bits of the vector are bitwise added to obtain the zero detection flag.

The principles of the present invention strive for the performance of high speed arithmetic operations. Such high speed operations can be useful for example during the arithmetic and logic operations which are required in the processing of streaming data, such as compressed via data.

BRIEF DESCRIPTION OF THE DRAWINGS

For a more complete understanding of the present invention, and the advantages thereof, reference is now made to the following descriptions taken in conjunction with the accompanying drawings, in which:

FIG. 8A is a diagram describing the bitfields of the arithmetic Logic Unit Instruction format;

FIG. 8B is a diagram describing the bit fields of a jump instruction;

FIG. 8C is a diagram of the bitfields of a shift instruction;

FIG. 8D is a diagram illustrating the divide instruction format;

FIG. 8E is a diagram of the load instruction format;

FIG. 8F is a diagram of the program move instruction format;

FIG. 8G is a diagram of the control instruction format; and

DESCRIPTION OF THE PREFERRED EMBODIMENTS

The principles of the present invention and their advantages are best understood by referring to the illustrated embodiment depicted in FIGS. 1–9 of the drawings, in which like numbers designate like parts.

Figure 1A:
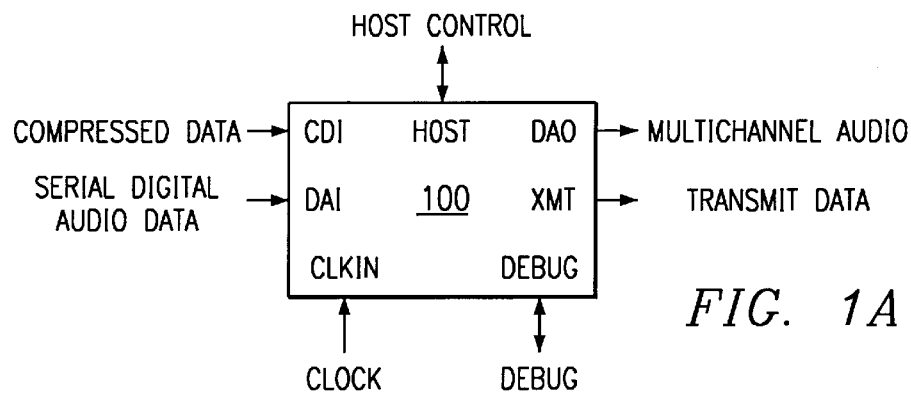
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input CDI port. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bits streams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each of 512 time samples, are multiplied by a time window and transformed into the frequency domain. Because the blocks of time samples overlap, each PCM input sample is represented by a two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encode each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC bit stream also includes additional information. For instance, each frame may include a frame header which indicates the bit rate, sample rate, number of encoded samples, and similar information necessary to subsequently synchronize and decode the AC-3 bit stream. Error detection codes may also inserted such that the processing device, such as decoder 100, can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the Advanced Televisions Systems Committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
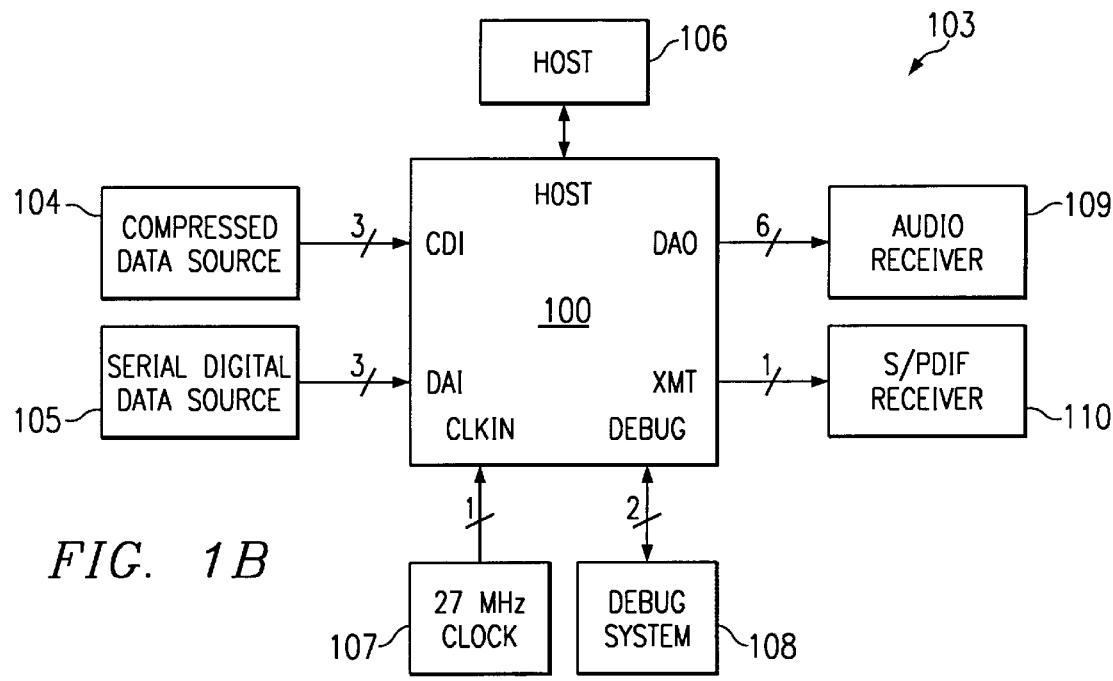
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio sources 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multi-channel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codecs for transmission to analog receiver circuitry.

Figure 1C:
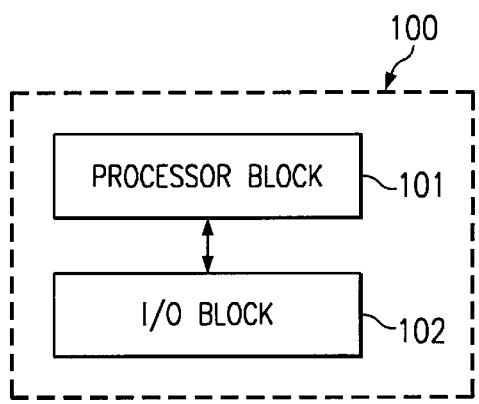
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and an I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
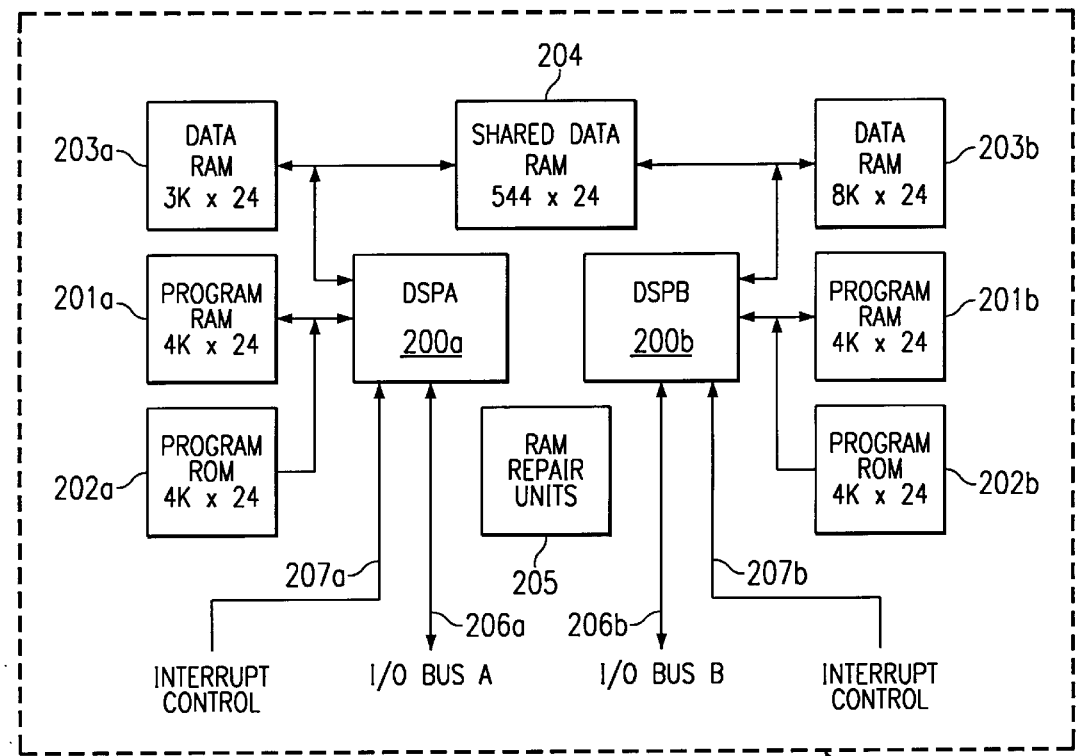
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b. Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b. DSP cores 200a and 200b are each based upon a time-multiplexed dual-bus architecture as depicted in further detail in FIG. 3. As shown in both FIG. 2 and FIG. 3, DSPs 200a and 200b are each associated with program and data RAM blocks 202 and 203. Data Memory 203 typically contains buffered audio data and intermediate processing results. Program Memory 201/202 (referring to Program RAM 201 and Program ROM 202 collectively) contains the program running at a particular time. Program Memory 201/202 is also typically used to store filter coefficients, as required by the respective DSP 200a and 200b during processing.

Figure 5:
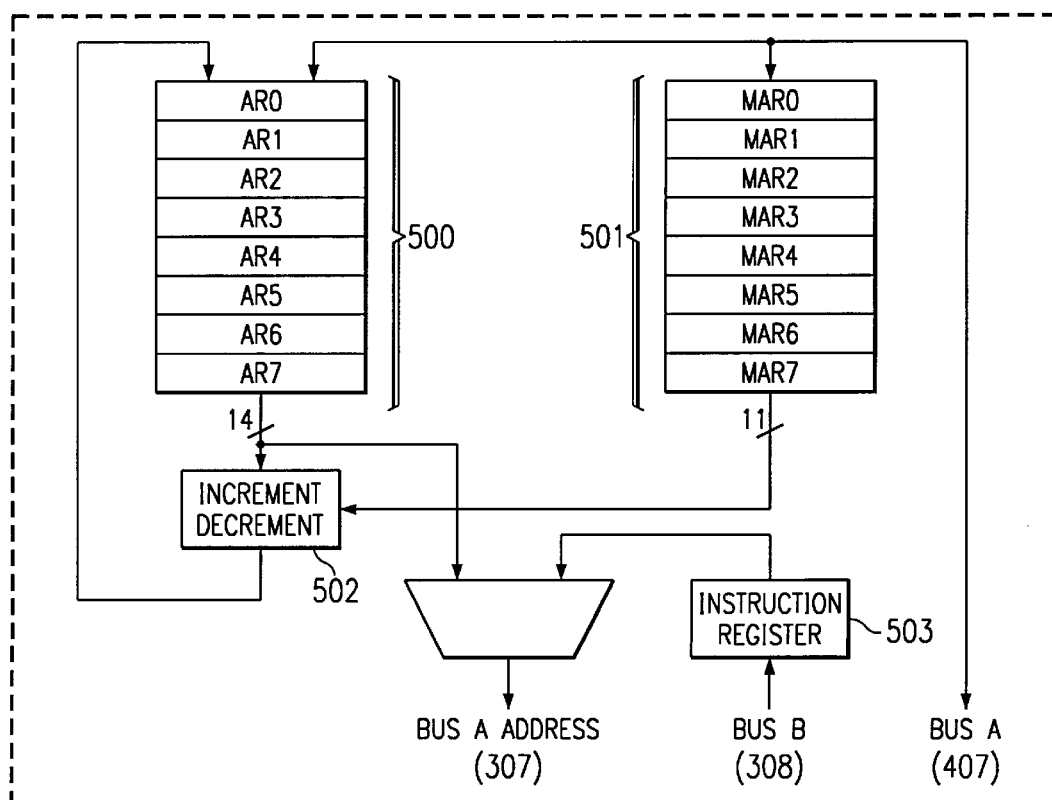
FIG. 5 is a detailed diagram of the Data Address Unit (DAU) within a selected DSP.
Figure 6:
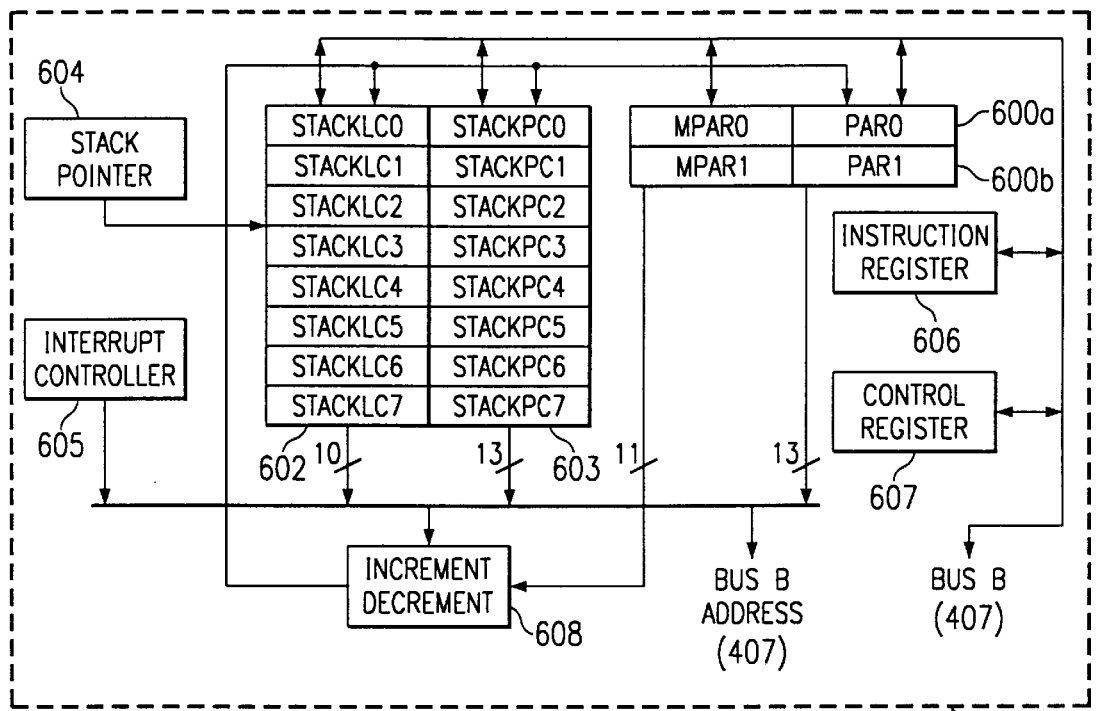
FIG. 6 is a diagram of a selected Program Address Unit (PAU)

DSP cores 200a and 200b also respectively include a Data Address unit 301 FIG. 5 for generating addresses to data memory 203, Program Address unit 301 FIG. 6 for generating addresses to Program Memory 201/202, Execution Unit 303 FIG. 7 which includes the circuitry required to perform arithmetic and logic operations on data received from either data memory or program memory, and buses 307 and 306 FIG. 7 for carrying instructions to data to support DSP operations.

Buses 306 and 307 are respectively referred to as the source A/destination bus (Bus_A) and the source B/instruction bus (Bus_B). Bus_A 306 connects to data memory 203, data address unit (DAU) 303, the A input of execution unit (EU) 303, and I/O registers 300. Bus_B connects to program memory 201/202, program address unit (PAU) 302, DAU 301, and the B input to Execution Unit (EU) 303.

I/O registers 300 discussed in further detail below, provide for direct register control of respective DSP 200a and 200b from an external device, such as Host 106 (FIG. 1B).

Figure 4:
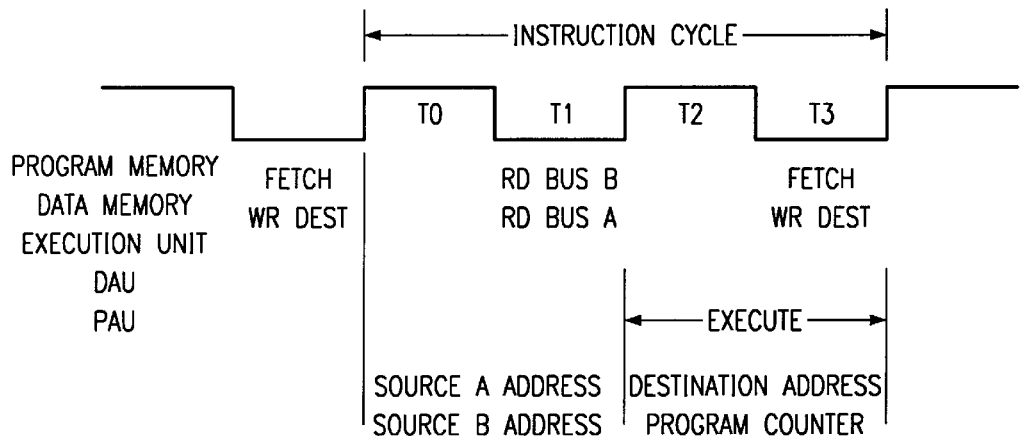
FIG. 4 is a diagram illustrating the operation of the DSPs of FIG. 3.

The overall operation of respective DSPs 200a and 200b can be described in reference to the diagram of FIG. 4. All instructions (instruction cycles) take two clock cycles (periods) to complete. During the first clock cycle, one operand is read from data memory 203 and a second operand is read from program memory 201/202 as directed by a prefetch instruction from program memory 201/202. During the second clock cycle, the result is stored in data memory 203 and the next instruction is prefetched from program memory 201/202.

Instruction execution occurs in four phases. In the first phase (T0), an instruction from a selected instruction register is decoded. In the second phase (T1), the A and B operands are read from registers or data memory. In the third phase (T2), an arithmetic or logic operation is performed by Execution Unit 303. In the fourth phase (T3), the result is stored and the next instruction is pre-fetched.

It should be noted that during the first half of the execution of typical arithmetic or logical instruction, the A operand to EU 303 is presented on Bus_A and the B operand to EU 303 is presented on Bus_B. During the second half of the execution of the instruction, the result from the EU 303 is presented on Bus_A and the next instruction fetched is presented on Bus_B.

Figure 3:
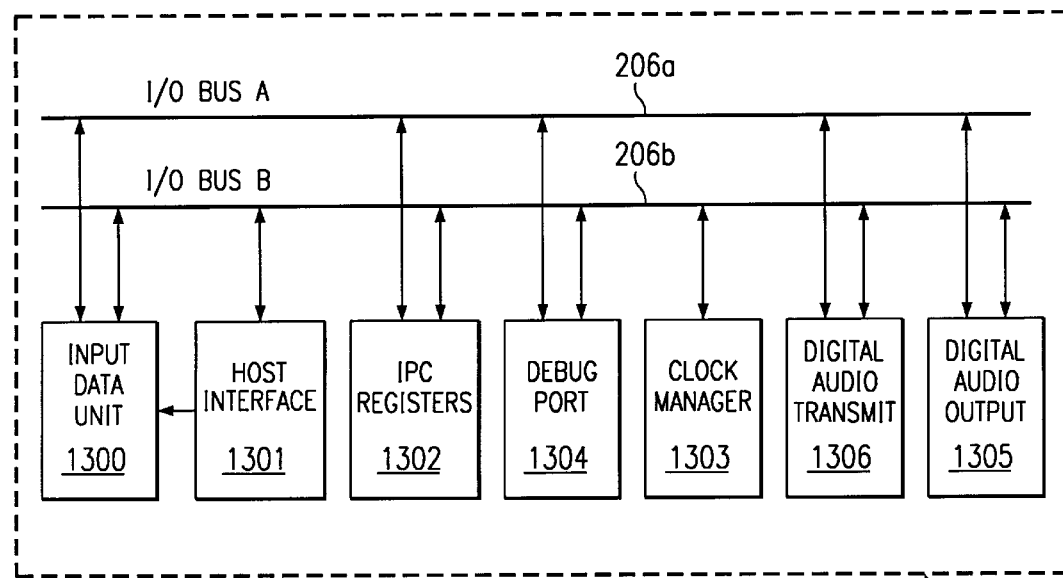
FIG. 3 is a diagram of the primary functional subblock of the I/O block of FIG. 1C.

I/O registers 1300 discussed in detail with regards to FIG. 3, provide for direct register control of a given DSP 200 from an external device, such as the Host.

The overall operation of DSPs 200 can be described in reference to the diagram of FIG. 4. All instructions (instruction cycles) take two clock cycles (periods) to complete. During the first clock cycle, one operand is read from data memory 203 and a second operand is read from program memory 201/202 as directed by a prefetch instruction from program memory 201/202. During the second clock cycle, the result is stored in data memory 203 and the next instruction is prefetched from program memory 201/ 202.

Instruction execution occurs in four phases. In the first phase (T0), an instruction from a selected instruction register is decoded. In the second phase (T1), the A and B operands are read from registers or data memory. In the third phase (T2), an arithmetic or logic operation is performed by Execution Uet 303. In the fourth phase (T3), the result is stored and the next instruction is pre-fetched.

It should be noted that during the first half of the execution of typical arithmetic or logical instruction, the A operand to EU 303 is presented on Bus_A and the B operand to EU 303 is presented on Bus_B. During the second half of the execution of the instruction, the result from the EU 403 is presented on Bus_A and the next instruction fetched is presented on Bus_B.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time stamp information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

FIG. 4 is a diagram illustrating the operation of the DSPs of FIG. 3.

In general, I/O registers are visible on both I/O buses, allowing access by either DSPA (200*a*) or DSPB (200*b*). Any read or write conflicts are resolved by treating DSPB as the master and ignoring DSPA.

FIG. 5 is a detailed block diagram of Data Address Unit (DAU) 301. DAU 301 consists of a stock of address registers (ARs) 500, eight modulo address registers (MARs) 501, an increment/decrement unit 502, and an instruction register 503. Data Address Unit 402 supports addressing up to 16K words of data memory.

An instruction word received in instruction register 503 from Bus_B can independently specify both the source location of the A operand and the destination address for operand A. The A operand can be stored in an AR register 500, an I/O register 1300 (for register direct addressing) or a location in data memory 203 (for direct addressing). When it is a location in data memory 203, the instruction word specifies the seven LSBs of the data memory address for direct addressing or an AR 500 that contains the data memory address during indirect addressing.

When direct addressing is selected, address register AR0 is used as the A operand source page register and address register AR1 is used as the destination page register. Bits 13 through 7 of each page register are used as the MSBs of the given source or destination address, which along with the seven LSBs from the received instruction, create the entire 14-bit data memory address. When indirect addressing is selected, the 14 LSBs of a specified AR constitute the entire required 14-bit data memory address.

The 14-bit contents of any specified AR 500 can be post-incremented or post-decremented after being read to Bus_A by increment/decrement circuitry 502. This updated value is written back into that AR 500 at the end of the first half of the instruction cycle. In addition, addressing may be specified to be "bit-reverse post-increment" or "bit-reverse post-decrement." Bit-reverse addressing is very useful, for example, for addressing the results of an FFT operation.

Results from an operation performed by execution unit can be written to an AR 500, an MAR 501, an I/O register 1300, the accumulators ACC0 or ACC1 discussed below in conjunction with the Execution Unit 303, or any location in data memory 203. Each AR 500 is 14-bits wide and each MAR 501 is eleven bits wide. Thus, if an AR 500 is the destination, the low 14 bits of the result are written to that register and if a MAR 501 is specified as the destination, the 11 LSBs of the result are written thereto. If the result is written to data memory 203, the memory address is generated and/or post-modified in a manner similar to that used for the A operand address.

Every Address Register (AR) 500 is associated with a Modulo Address Register (MAR) 501. MARs 501 specify the size of circular buffers (reverse carry address blocks) of up to 2K words. For a buffer of size N+1, the value N is written to the MAR register. The circular buffer page is then determined from the upper bits of the corresponding AR register, and this page size scales with the buffer size N+1. The buffer size N+1 is represented with an M-bit number in the MAR and the circular buffer can start on $2^m$ block boundaries. The page is determined by bits 13 through 13-M of the selected AR register. For example, if the AR0 register contains 0x3FF0 and MAR0 contains 0x00A, the address sequence generated by a series of instructions with post incremented addressing will be (0x3FF1, 0x3FF1, 0x3FF2, . . . , 0x3FFA, 0x3FF0, 0x3FF1, . . . )

It should be noted that bit-reverse addressing is provided for efficient resequencing of data points, when processing such as a Radix-2 FFT routine is being performed. For this reason, buffer sizes for bit reverse buffers are always be set to a power of 2. Additionally, all addressing options are completely specified in the instruction word and can be performed on the A operand address as well as the destination address.

FIG. 6 is a diagram of a selected Program Address Unit 302. Generally, Program Address Unit (PAU) 302 generates the 13-bit address for program memory 201/202, supporting a total of 8K words of program memory. Two program memory addresses are generated per instruction cycle. If the current instruction requires a source B address, the address generated by PAU 302 during the first half of the cycle is the B operand address. The address generated during the second half of the cycle is the next instruction address.

As shown in FIG. 6, PAU 302 consists of two 13-bit Program Address Registers (PARs) 600*a* and 600*b*, two 11-bit Modulo Program Address Registers (MPARs) 601*a* and 601*b*, eight stack locations 603 for storing 13-bit program counter (PC) values and eight stack locations 602 for storing 10-bit loop counter (LC) values. There is also a stack pointer 604 that points to the current PC and the current LC. Note that there is no dedicated PC or LC register. PAU 302 further includes an interrupt controller 605, instruction register 606, control register 607 and increment/decrement circuitry 608.

The next instruction address normally comes from the program counter stack location identified by pointer 604. After reading the instruction, the program counter in that location is incremented by circuitry 608. During a jump instruction (JMP), the jump address comes from an accumulator (ACC) or immediate short data. This address is loaded into the PC pointed to stack location during the first half of the jump instruction. The next instruction is read from the new address in the PC stack location.

When a jump-to-subroutine (JMPS) instruction is executed, the value in the pointed-to program counter location is incremented, the stack pointer 604 is incremented, and the jump address is written to the new PC stack location. When a return-from-subroutine (RET) instruction is executed, the stack pointer 604 is decremented and the next instruction is read from the old PC stack location. Incrementing stack pointer 604 pushes the PC and LC to the stack and decrementing the stack pointer pops the PC and LC from the stack. Since the stack has eight entries, one primary (main) routine and seven levels of subroutines are directly supported by the hardware. The stack is circular, which means that a stack overflow will overwrite data previously pushed onto the stack.

The load instruction (LD) and the repeat (REP) command can load a loop counter (LC) value from the Bus_B during the first half of an instruction cycle into the current LC stack location (register). Loading this register causes the next instruction to be executed one time more than the number loaded into the LC. Every time the next instruction is executed, LC value in the current stack location is decremented. Since the current PC value does not have to be incremented, LC value is decremented by the increment/ decrement unit 608 during the time that the PC value is normally incremented. Instructions with immediate data are not repeated.

Looping can be accomplished by repeating a jump to subroutine instruction. Nested loops are possible since both the PC and LC are pushed onto the stack during jump-to-subroutine execution. This type of looping has two instructions of overhead: jump to subroutine; and return.

During the first half of an instruction cycle, the B operand can be read from a program address register (PAR) 600 or from program memory 402. If the B operand comes from program memory, the address can come from PC+1 (immediate addressing) or a PAR 600 (indirect addressing). If indirect addressing is specified, the contents of the specified PAR 600 can be post-modified. Specifically, the contents can be incremented or decremented by increment/ decrement circuitry 608. There is no reverse carry option. Although post-modify can be specified in the instruction word, whether it is an increment or decrement is determined by the DEC bit in control register 607. When DEC is high, the contents of the specified PAR 600 is decremented.

Each PAR 600 has an associated Modulo Program Address register (MPAR) 601. MPARs 601 create circular buffers of length N+1 that start at $2^m$ block boundaries, where N is the value in the selected MPAR 601 and M is the number of bits used to represent N. This allows circular buffers of any length up to 2K words. The effect of the MPAR registers values on PAR values is identical to the MAR/AR register operation in DAU 403, discussed above.

The PC 603, LC 602, PARs 600, MPARs 601, control register 607, the top stack location and program memory pointed to by a PAR value can be loaded from immediate data (13 bits) or from the accumulator in Execution Unit 303. The LD (load) instruction loads them during the first half of an instruction cycle. The PC, LC, PARs, MPARs, control register 607, top stack location and program memory pointed to by a PAR can be read by a move program (MVP) instruction.

Figure 7A:
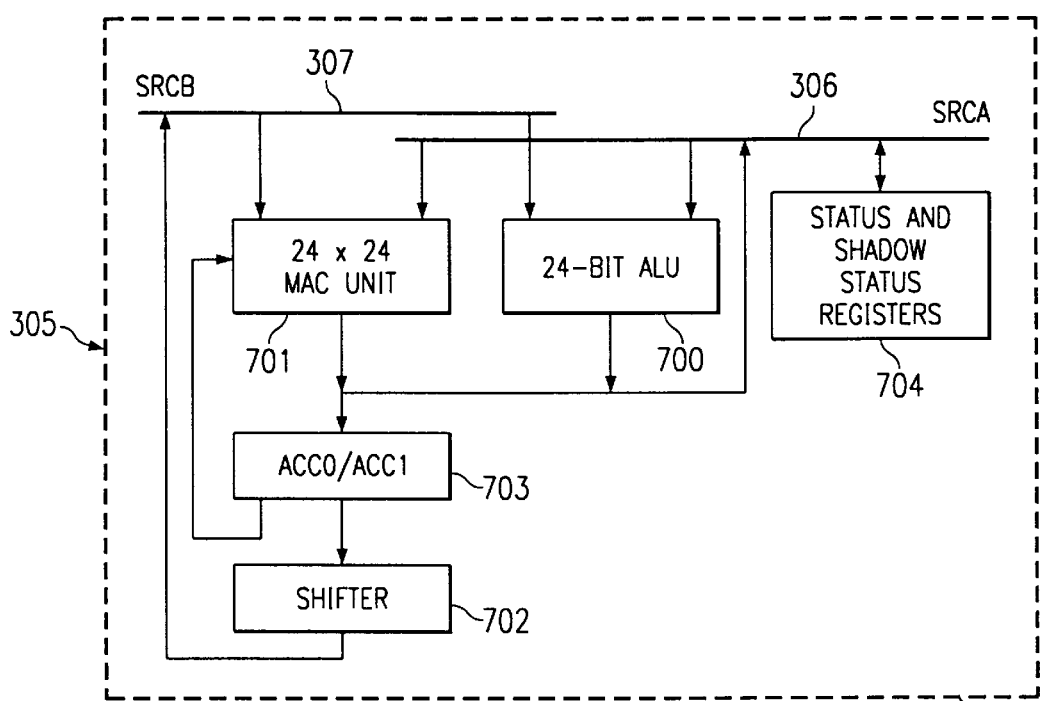
FIG. 7A is a diagram of the Execution Unit within a selected DSP.

Execution Unit (EU) 303 is generally the main processing block in each DSP 200. FIG. 7A is a diagram of a selected one of the Execution Units 303. As shown, it consists of an arithmetic/logic unit (ALU) 700, a multiply-accumulate unit (MAC) 701, a shift unit (SHF) 702, two 48-bit accumulator registers (ACC0/ACC1) 703 and status and shadow status registers 704.

Arithmetic/logic unit 700 is used for the 24-bit arithmetic and logic operations. When arithmetic/logic instructions are executed, 24-bit operands are read from the SRCA (source A) and SRCB (source B) buses 306 and 307 and the 24-bit result is returned on SRCA bus 306. If an ACC 703 is specified as the destination, the 24-bit result gets written into the high 24 bits of a designated one of the 48-bit accumulators 703. The low 24 bits of the designated accumulator 703 remain unchanged. The arithmetic/logic unit also includes saturation logic for arithmetic operations.

Multiply-accumulate unit 701 is used for executing the multiply and multiply-accumulate instructions MPY (multiply), MPYL (multiply and load results in accumulator), MAC (multiply and add with accumulator contents), MACL (multiply, add with contents of accumulator and load result in accumulator), MSU (multiply and subtract from accumulator contents) and MSUL (multiply, subtract from contents of accumulator and load result in accumulator). Each of these instructions will be discussed in detail Below in conjunction with FIGS. 8A–8G. When any one of these instructions is executed, the 24-bit operands from SRCA bus 306 and SRCB bus 307 are first multiplied to generate a 48-bit result. When the MPY and MPYL instructions are executed, a zero is added to 48-bit result of the multiplication. The MAC and MACL instructions cause the 48-bit contents of a designated ACC 703 to be added to the multiplication result. When the MSU and MSUL instructions are executed, the 48-bit result of the multiplication is subtracted from a designated ACC 703. When an accumulator (ACC) 703 is specified as the destination, the low 24 bits of the result of a multiplication are always written to the low 24 bit positions of the selected 48-bit accumulator 703.

The high 24 bits of the result of the multiplication and addition (or subtraction) steps from the execution of the MPY, MAC and MSU instructions are driven on SCRA bus 406. If an accumulator 703 is specified as the destination, these 24 bits are also written into the high 24 bits of the given accumulator 703.

When any of the MPYL, MACL, and MSUL instructions are executed, the low 24 bits of the result of the addition are driven on SRCA bus 306. If an accumulator is specified as the destination, the low 24 bits of the result written into both the high and low 24-bit word positions of the designated accumulator 703.

Shift unit 702 allows for the scaling of the contents of a given accumulator 703 (e.g., as a result of a filter convolution). The shift (SHF) and shift low (SHFL) instructions each shift the 48-bit contents of the designated accumulator left by 1, 2, or 3 bits or right by one bit. The sign bit is extended during a shift right by one operation. When the SHF instruction is executed and an accumulator 703 is the destination, the 48-bit result of the shift is stored in the designated accumulator. When the SHFL instruction is executed and an accumulator 703 is the destination, the low 24 bits of the 48-bit result of the shift is written into both the low 24 bits and the high 24 bits of the designated accumulator. When an accumulator 703 is not the destination, the high 24 bits of the shift result are driven on bus SRCA 3406 during SHF execution and the low 24 bits during SHFL execution.

Barrel shift operations are performed in the MAC unit 701. Barrel shifting left for 24-bit operands can be accomplished by multiplying the operand by $_2N$ and storing the low result, where N designates the number of bit positions shifted. Barrel shifting right can be accomplished by multiplying by $2^{(24-N)}$.

Shift unit 702 and arithmetic/logic unit 700 are used for executing the divide instruction. The divide instruction (DIV) divides the contents of the designated accumulator 703 by the operand presented on SRCA bus 406 to perform one iteration of a non-restoring fractional division algorithm. Hence, the DIV instruction is repeated 24 times to complete a 24-bit division. After 24 iterations, the high 24 bits of the accumulator contain the partial remainder and the low 24 bits contain the quotient. Each DIV instruction first requires that an exclusive-OR (XOR) operation on the sign bits of the operands from SRCA bus 306 and the contents of the designated accumulator. The contents of the accumulator are then shifted left by one bit with the carry bit (C) shifted into the accumulator LSB position, except during the first iteration when the C bit is cleared. If the result of the XOR operation of the previous iteration was a logic one, the operand on SRCA bus 306 is added to the high 24 bits of the designated accumulator and the result stored back in the high 24 bits of the designated accumulator. If the result is zero, the operand from SRCA bus 306 is subtracted from the high 24 bits of the designated accumulator and the result stored back in the accumulator high 24 bits. The carry from an add or subtract sets the carry for the next iteration.

EU 700 operates in conjunction with seven status bits (V, C, Z, N, U, POV2, and POV3) and three control bits (RND, MPYSHF, and SAT). These are maintained in Status register, which is further described in the discussion of the Control and Status register section. Shadow copies of these bits are also located in a Shadow Status register 704, which supports context switching during interrupt service routines.

V is the overflow status bit which is set when an arithmetic operation overflows. The V bit is "sticky", i.e., once it is set, it remains set until explicitly cleared by the programmer. The V bit is cleared by writing a zero to its position in the Status Register.

C is the carry flag representing the carry out or borrow out resulting from the execution of an arithmetic instruction. The C bit is cleared by writing a zero to the appropriate bit position in the Status Register.

Z is the zero flag which is set high if the result of an arithmetic or logical operation is zero. Z is updated by the 48 bit result of the execution of the multiply, divide, and shift instructions and by the 24-bit result of the execution of the add, subtract, and logical instructions.

N is the negative flag and is high if the MSB of the result of an operation is high. If the result represents a number, then N specifies whether it is positive or negative. During execution of a MPYL, MACL, MSUL, or SHFL instruction N is determined by the internal 48-bit result, not the 24-bit data on the SRCA bus.

U is the unnormalized flag. U is set high if the result of an arithmetic operation is "unnormalized." A result is unnormalized if the MSB and the MSB minus one bits are the same. U is updated by the internal 48-bit result, not the 24-bit data on the SRCA bus.

POV2 is the 2-bit potential overflow flag. This bit is set if the MSB and MSB minus one bits are not the same. This bit is also sticky. The POV2 bit is cleared by writing a zero to its position in the Status Register.

POV3 is the 3-bit potential overflow flag. It is set if the MSB, MSB minus one, and MSB minus two bits are not all the same. This bit is sticky and is cleared by writing a zero to its register position.

The RND bit is the round mode control bit. When enabled, MPY, MAC, and MSU instruction results are rounded to 24 bits if the destination is 24-bits wide. The RND mode does not affect execution MPYL, MSUL, or MACL instructions and also has no effect on the operation of arithmetic/logic unit 700 or the shifter 702. Alternatively, 48-bit results from the execution of the MPY, MAC, and MSU instructions can be rounded to 24 bits by using a rounded accumulator (ACC0 r, ACC1 r) as the destination regardless of the state of the RND control bit.

The MPYSHF bit automatically shifts the multiplication result of MPY and MAC instructions left by one bit when set. The MPYSHF bit does not affect execution of the MPYL, MACL, or MSUL instructions.

The SAT mode bit enables saturation logic in arithmetic/logic unit 700 and/or MAC unit 701. When enabled, the SAT bit causes a result to be saturated in the case of a twos complement overflow from an arithmetic operation. The saturated result from arithmetic/logic unit 700 for 24-bit operations is a 24-bit number. The saturated result from MAC unit 701 for multiply or MAC operations is a 48-bit number. For the MPYL, MACL, and MSUL instructions, the saturated result is only a 24-bit number. The SAT bit does not affect SHF or SHFL instruction execution.

Status and Shadow Status registers 706 are connected to the SRCA bus 306. Since they are I/O mapped, they can be used as the SRCA operand or destination for most ALU operations. Control register 607 (FIG. 6) is connected to the SRCB bus and is loaded by the LD instruction and read by the MVP instruction. The status and shadow status register bitfields are set forth in TABLES 1 and 2 respectively. The bitfields for the control register are found in TABLE 1.

TABLE 1

Status Register

| Field | Bits | Description |
|---|---|---|
|  | 23:13 | Unused. |
| MPYSHF | 12 | Multiplier shift mode control bit. |
| SAT | 11 | Saturation mode control bit. |
| RND | 10 | Round mode control bit. |
| POV3 | 9 | Potential overflow (3-bit) flag. (Sticky) |
| POV2 | 8 | Potential overflow (2-bit) flag. (Sticky) |
| STKPTR | 7:5 | Stackpointer. Points to the current program and repeat counters |
| N | 4 | Negative flag. |
| Z | 3 | Zero flag. |
| V | 2 | Overflow flag. (Sticky) |
| U | 1 | Unnormalized flag. |
| C | 0 | Carry flag. |

TABLE 2

Shadow Status Register

| Field | Bits | Description |
|---|---|---|
|  | 23:13 | Unused. |
| MPYSHE | 12 | Multiplier shift mode control bit. |
| SAT | 11 | Saturation mode control bit. |
| RND | 10 | Round mode control bit. |
| POV3 | 9 | Potential overflow (3-bit) flag. (Sticky) |
| POV2 | 8 | Potential overflow (2-bit) flag. (Sticky) |
|  | 7:5 | Unused. Always reads zero |
| N | 4 | Negative flag. |
| Z | 3 | Zero flag. |
| V | 2 | Overflow flag. (Sticky) |
| U | 1 | Unnormalized flag. |
| C | 0 | Carry flag. |

A LD (load) instruction can be used to write the contents of accumulators 703 or immediate short (13 bits) data to a PAR 600, an MPAR 601, the control register(CR), the program counter (PC), the loop counter (LC), or the last PC and REP pushed onto the stack (PC-1 and LC-1). It can also write the contents of an accumulator 703 or immediate short data to program memory pointed to by the contents of a PAR 600.

The MVP (move program) instruction can move immediate long data, the contents of an accumulator 703, PAR 600, MPAR 601, Control Register 607, a Program Counter register 603 or a Loop Counter register. It can also move program memory 201 contents pointed to by the contents of PAR 600 to any destination described above and any of the stack pointer locations (STACKPC[0-7] and STACKLC[0-7]). The information in the specified PAR 600 can be post modified or not post modified.

The contents of a stack pointer 604 can be accessed by reading bits 5 through 7 of the Status register. Bits 5 through 7 of the Shadow Status register are always low.

Each of the instruction formats can be described in conjunction with FIGS. 8A–8G. TABLES 5–13 set out the bit encodings for each of the individual bitfields. For a detailed description of the instruction set, please refer to Appendix A.

Generally, the instruction set allows flexible addressing of two source operands and the destination of the result. In one instruction the main ALU operation is performed and up to three memory address pointers can be updated. The assembly code syntax is: OPCODE SRCA, SRCB, DEST.

FIG. 8A is a diagram describing the bitfields of the Arithmetic Logic Unit Instruction format. Each of these instructions includes an opcode field comprising bits 19–23 of the 23-bit instruction word. Bits 16–18 designate source B (srcB) and bits 8–15 designate source A (srcA). The destination is designated by bits 0–7.

TABLE 2 generally describes the opcode field encodings.

TABLE 2

Opcode Field (opcode):

| Opcode | Instruction | Opcode | Instruction |
|---|---|---|---|
| 00000 | NOP | 10000 | SHF |
| 00001 | AND | 10001 | SHFL |
| 00010 | OR | 10010 | MVP |
| 00011 | XOR | 10011 | SUBR |
| 00100 | ADD | 10100 | MAC1 |
| 00101 | ADDC | 10101 | MACL1 |
| 00110 | SUB | 10110 | MSU1 |
| 00111 | SUBC | 10111 | MSUL1 |
| 01000 | MPY | 11000 | JMPS |
| 01001 | MPYL | 11001 | JMP |
| 01010 | MAC | 11010 | LD/REP |
| 01011 | MACL | 11011 | RET/RET1 |
| 01100 | MSU | 11100 | TRAP |
| 01101 | MSUL | 11101 | Reserved |
| 01110 | MVD | 11110 | Reserved |
| 01111 | DIV | 11111 | Reserved |

Generally, the following operations can be specified in the opcode field: add source A with source B (ADD); add source A to source B and the carry bit (ADDC); divide iteration (DIV); jump to a new address (JMP); jump to subroutine (JMPS); load (LD); multiply source A with source B and add result with accumulator contents (MAC); multiply source A and source B and add with accumulator contents, and if destination is an accumulator, store the LSBs of the result in both halves of the designated accumulator (MACL); multiply source A with source B (MPY); multiply source A and source B, and if an accumulator is the destination, load the LSB's of the result into both halves (MPYL); multiply source A and source B and subtract result from contents of a designated accumulator (MSU); multiply source A with source B and subtract from a designated accumulator, and if an accumulator is the destination, store the LSB's of the result in both halves of the designated accumulator (MSVL); move data from source to destination on source A bus (MVD); move data from the source B bus to destination (MVP); no operation (NOP); load loop counter (REP); return from subroutine or interrupt (RET/RET1); shift accumulator contents, and if accumulator is the destination, load 48-bit result, otherwise store 24 MSB at destination (SHF); shift accumulator contents, and if accumulator is destination, store 24 LSBs in both halves of the destination accumulator, otherwise store 24 LSBs in destination register SHFL; subtract source A from source B (SUB); subtract source A and carry bit from source B (SUBC); subtract source A and carry bit from source B (SUBC); subtract source B from source A (SUBR); and generate debug interrupt (TRAP).

TABLE 3 specifies the source A field (srcA) encoding for the three available addressing modes (direct, register indirect and register direct). In TABLE 5, the "direct address" represents 7-bit address within the current source page, the source page being determined by address register AR0 (data address unit 301, FIG. 5). ARx presents one of eight data registers 500 (AR7-AR0) within data address unit 301. MARx represents one of eight data modulo registers 501 (also in data address unit 301, FIG. 5). The term "IOREGx" represents one of thirty-two possible I/O register addresses. The enable bit ENable post-modify operations when set. The identification bit ID determines whether post-modify is increment (ID=0) or decrement (ID=1). The BR bit specifies bit-reversed addressing when set.

TABLE 3

Source A field (srcA)

| Mode | 15 | 14 | 13 | 12 | 11 | 10 | 9 | 8 |
|---|---|---|---|---|---|---|---|---|
| Direct | 0 | | | direct address | | | | |
| Register Indirect | 1 | 0 | | ARx | | | BR | EN | ID |
| Register Direct | 1 | 0 | | ARx | | 0 | 0 | 0 |
| | 1 | 1 | | MARx | | 1 | 0 | 0 |
| | 1 | 1 | | IOREGx | | | | 1 |

TABLE 4 describes the source B field (srcB) encoding. In TABLE 6, PARx designates a PAR register 700 (FIG. 7A) and ACCX designates an accumulator 803 (FIG. 8, EO).

TABLE 4

Source B Field (srcB)

| Mode | 18 | 17 | 16 |
|---|---|---|---|
| PAR0 indirect | 0 | 0 | 0 |
| PAR0 indirect w/ post modify | 0 | 0 | 1 |
| PAR0 direct | 0 | 1 | 0 |
| ACC0 | 0 | 1 | 1 |
| PAR1 indirect | 1 | 0 | 0 |
| PAR1 indirect w/ post modify | 1 | 0 | 1 |
| ACC1 | 1 | 1 | 0 |
| Immediate | 1 | 1 | 1 |

TABLE 5 describes the encoding for the destination (dest) field for setting the direct, register indirect, and register direct addressing modes. The labels ARx, MARx, ACCx, IOREGx, EN, ID, BR interpreted as was done with regards to discussion above of TABLE 5. The label ACCxr designates one of the accumulators, with the result rounded to the most significant 24 bits.

TABLE 5

Destination Field (dest)

| Mode | 7 | 6 | 5 | 4 | 3 | 2 | 1 | 0 |
|---|---|---|---|---|---|---|---|---|
| Direct | 0 | | | direct address | | | | |
| Register Indirect | 1 | 0 | | ARx | | BR | EN | ID |
| Register Direct | 1 | 1 | | ARx | | 0 | 0 | 0 |
| | 1 | 1 | | MARx | | 1 | 0 | 0 |
| | 1 | 1 | | ACCx | | 0 | 1 | 0 |
| | 1 | 1 | | ACCxr | | 1 | 1 | 0 |
| | 1 | 1 | | IOREGx | | | | 1 |

The following examples of an ADD instruction illustrate possible addressing modes:

(1) add *AR2+, *PAR0, *AR3+/*SRCA=AR2 indirect with post increment; SRCB=PAR0 indirect; DEST=AR3indirect with post increment*/

(2) add *AR2, *PAR0m, *AR3/*SRCA=AR2 indirect; SRCB=PAR0 indirect with most modify; DEST=AR3 indirect*/

(3) add *AR2-, PAR0m, *AR3-/*SRCA=AR2 indirect with post decrement; SRCB=PAR0 register direct; DEST=AR3 indirect with post decrement*/ (4) add *AR2b+, 0x123456, *AR3b+/*SRCA=AR2 indirect with bit reverse post increment; SRCB=immediate DEST=AR3 indirect with bit reverse post increment*/

(5) add *AR2b-, ACC0, *AR3b-, /*SRCA–AR2 indirect with bit reverse post decrement; SRCB=ACC0; DEST=AR3 indirect with bit reverse post decrement*/

(6) add *AR2b-, ACC0, *AR3b+, /*SRCA=AR2 indirect with bit reverse post decrement; SRCB=ACC0; DEST=AR3 indirect with bit reverse post increment*/

(7) add AR2, ACC0, AR3/*SRCA=AR2registerdirect; SRCB=ACC0;DEST=AR3registerdirect*/

(8) add MAR2 ACC0, MAR3/*SRCA= MAR2registerdirect; SRCB=ACC0; DEST=MAR3 registerdirect*/

(9) add 0x19, ACC0, ACC0/*SRCA=direct address, AR0 is the page register; SRCB=ACC0; DEST=ACC0*/ Any combination of addressing modes for SRCA, SRCB, and DEST are permitted.

(10) add 0x19, ACC0, 0x27/*SRCA=direct address (0x19), AR0 is the page register; SRCB=ACC0; DEST=direct address(0x27), AR1 is the page register*/

FIG. 8B describes the bit fields of a jump instruction. The bitfield comprised of bits 19–23 contains the opcode, the bitfield comprised of bits 15–18 contains the condition code (cc), and the bitfield comprised of bits 0–14contains immediate data (scrD).

TABLE 6 depicts the encoding of the condition code field (cc). This field generally identifies logic conditions, such as overflow, carry state and the like.

TABLE 6

Condition Code Field (cc)

| Condition | Label | 18 | 17 | 16 | 15 |
|---|---|---|---|---|---|
| carry | C | 0 | 0 | 0 | 0 |
| not carry | NC | 0 | 0 | 0 | 1 |
| equal to zero | EQ | 0 | 0 | 1 | 0 |
| not equal to zero | NE | 0 | 0 | 1 | 1 |
| greater than or equal to zero | GE | 0 | 1 | 0 | 0 |
| less than zero | LT | 0 | 1 | 0 | 1 |
| less than or equal to zero | LE | 0 | 1 | 1 | 0 |
| greater than zero | GT | 0 | 1 | 1 | 1 |
| potential overflow 2 | POV2 | 1 | 0 | 0 | 0 |
| potential overflow 3 | POV3 | 1 | 0 | 0 | 1 |
| overflow | V | 1 | 0 | 1 | 0 |
| not overflow | NV | 1 | 0 | 1 | 1 |
| unnormalized | U | 1 | 1 | 0 | 0 |
| normalized | NU | 1 | 1 | 0 | 1 |
| Reserved | | 1 | 1 | 1 | 0 |
| always | — | 1 | 1 | 1 | 1 |

TABLE 7 describes the Immediate Data Field (srcD). In TABLE 7, the label AC represents the selection of one of two accumulators 803 (FIG. 8), INT whether the ET instruction (INT=0) or RETI instruction (INT=1) is executed.

TABLE 7

Immediate Data Field (srcD)

| Mode | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| immediate | 0 | | | | | | Immediate short data | | | | | | | | |
| accumulator | 1 | AC | x | x | x | x | x | x | x | x | x | x | x | x | x |
| return | INT | x | x | x | x | x | x | x | x | x | x | x | x | x | x |

FIG. 8C is a diagram of the bitfields of a shift instruction. Bits 19–23 are the opcode, bits 8–18 are the shift control bits (shFctl) and bits 0–7 designate the destination. The opcode and destination encodings are the same as was described above. The shift control bits are encoded as shown in Table 7.

TABLE 7

Shift Control Field (shfctl)

| Mode | 18 | 17 | 16 | 15 | 14 | 13 | 12 | 11 | 10 | 9 | 8 |
|---|---|---|---|---|---|---|---|---|---|---|---|
| Fixed shift right by 1 | 0 | 0 | AC | x | x | x | x | x | x | 0 | 0 |
| Fixed shift left by 1 | 0 | 0 | AC | x | x | x | x | x | x | 0 | 1 |
| Fixed shift left by 2 | 0 | 0 | AC | x | x | x | x | x | x | 1 | 0 |
| Fixed shift left by 3 | 0 | 0 | AC | x | x | x | x | x | x | 1 | 1 |

In TABLE 10, bit 16 (AC) flags one of the two accumulators 803. The fixed shift modes are used in conjunction with the shf/shfl codes discussed above.

The divide instruction format is illustrated in FIG. 8D. The bitfield comprised of bits 19–23 contains the opcode, bits 16–19 designate source B (srcB), bits 8–15 designate source A (srcA) and the bitfield comprised of bits 0–7 designates the destination. The source A, source B, destination and opcode fields are encoded as discussed above.

FIG. 8E is a diagram of the load instruction format. The bitfield comprised of bits 19–23 contains the opcode, bits 15–18 comprise the destination B bitfield (destB) and bits 0–14 comprise the immediate data bitfield (srcD). See the Tables above, along with TABLE 8, which describes the destination B field.

TABLE 8

Destination B Field (destB)

| Mode | 18 | 17 | 16 | 15 |
|---|---|---|---|---|
| PAR0 indirect | 0 | 0 | 0 | 0 |
| PAR0 indirect with post-modify | 0 | 0 | 0 | 1 |
| PAR0 direct | 0 | 0 | 1 | 0 |
| MPAR0 direct | 0 | 0 | 1 | 1 |
| Program counter (PC) | 0 | 1 | 0 | 0 |
| Previous program counter (PC-1) | 0 | 1 | 0 | 1 |
| Accumulator 0 | 0 | 1 | 1 | 0 |
| Accumulator 1 | 0 | 1 | 1 | 1 |
| PAR1 indirect | 1 | 0 | 0 | 0 |
| PAR1 indirect with post-modify | 1 | 0 | 0 | 1 |
| PAR1 direct | 1 | 0 | 1 | 0 |
| MPAR1 direct | 1 | 0 | 1 | 1 |
| Loop counter (LC) | 1 | 1 | 0 | 0 |
| Previous loop counter (LC-1) | 1 | 1 | 0 | 1 |
| Control register | 1 | 1 | 1 | 0 |
| Reserved | 1 | 1 | 1 | 1 |

TABLE 9

Program Move Source B Field (mvsrcB)

| Mode | 18 | 17 | 16 | 15 | 14 |
|---|---|---|---|---|---|
| PAR0 indirect | 0 | 0 | 0 | 0 | 0 |
| PAR0 indirect with post-modify | 0 | 0 | 0 | 1 | 0 |
| PAR0 direct | 0 | 0 | 1 | 0 | 0 |
| MPAR0 direct | 0 | 0 | 1 | 1 | 0 |
| Program counter (PC) | 0 | 1 | 0 | 0 | 0 |
| Previous program counter (PC-1) | 0 | 1 | 0 | 1 | 0 |
| Accumulator 0 | 0 | 1 | 1 | 0 | 0 |
| Accumulator 1 | 0 | 1 | 1 | 1 | 0 |
| PAR1 indirect | 1 | 0 | 0 | 0 | 0 |
| PAR1 indirect with post-modify | 1 | 0 | 0 | 1 | 0 |
| PAR1 direct | 1 | 0 | 1 | 0 | 0 |
| MPAR1 direct | 1 | 0 | 1 | 1 | 0 |
| Loop counter (LC) | 1 | 1 | 0 | 0 | 0 |
| Previous loop counter (LC-1) | 1 | 1 | 0 | 1 | 0 |
| Control register | 1 | 1 | 1 | 0 | 0 |
| Immediate | 1 | 1 | 1 | 1 | 0 |
| Stack Loop Counter | LCx | | | 0 | 1 |
| Stack Program Counter | PCx | | | 1 | 1 |

FIG. 8G is a diagram of the control instruction format which includes only one active field; the opcode field is defined by bits 19–23. Bits 0–18 are undefined (don't care).

TABLE 10 is a Flag and Mode Summary which summarizes which flags are updated by each instruction, and which mode affects each instruction. The label "4" stands for a normal update. The label "k" means that the flag is updated, always based on a 48-bit result. The label "0" represents a cleared register.

TABLE 10

Flag And Mode Summary

| Instruction | POV3 | POV2 | N | Z | V | U | C | SAT | RND | MPYSHF |
|---|---|---|---|---|---|---|---|---|---|---|
| ADD/ADDC | 4 | 4 | 4 | 4 | 4 | 4 | 4 | 4 | | |
| AND/OR/XOR | | | 4 | 4 | | | | | | |
| DIV | | | 4 | 4 | | 4 | 4 | | | |
| JMP/JMPS | | | | | | | | | | |
| LD/REP | | | | | | | | | | |
| MAC/MAC1 | 4 | 4 | 4 | 4 | 4 | 4 | 4 | 4 | 4 | 4 |
| MACL/MAC1 | | | 4 | 4 | 4 | k | k | 4 | | |
| MPY | 4 | 4 | 4 | 4 | 4 | 4 | 0 | 4 | 4 | 4 |
| MPYL | | | 4 | 4 | 4 | k | 0 | 4 | | |
| MSU/MSU1 | 4 | 4 | 4 | 4 | 4 | 4 | 4 | 4 | 4 | 4 |
| MSUL/MSUL1 | | | 4 | 4 | 4 | k | k | 4 | | |
| MVD/MVP | | | | | | | | | | |
| NOP | | | | | | | | | | |
| RET/RET1 | | | | | | | | | | |
| SHF/SHFL | | | k | k | k | k | 0 | | | |
| SUB/SUBC | 4 | 4 | 4 | 4 | 4 | 4 | 4 | 4 | | |
| SUBR | 4 | 4 | 4 | 4 | 4 | 4 | 4 | 4 | | |
| TRAP | | | | | | | | | | |

FIG. 8F is a diagram of the program move instruction format. The opcode bitfield is comprised of bits 19–23, the move source B field (mvsrcB) is comprised of bits 14–18, the destination is designated by the field of bits 0–7, and bits 8–13 are undefined (don't care). TABLE 9 defines the Program Move Source B Field (mvsrcB). LCx designates one of the eight LC stack locations and PCx designates one of the eight PC stack locations. Immediate data is fetched from program memory and instructions with the immediate data for mvsrB are two words long.

Figure 9:
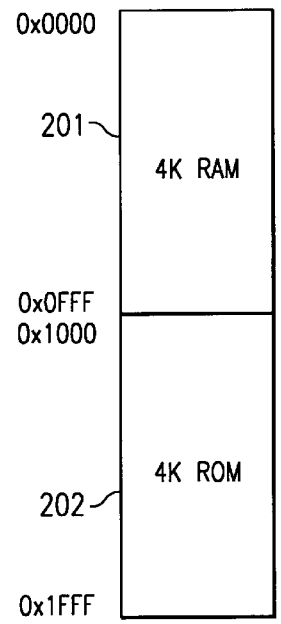
FIG. 9 is a diagram illustrating the organization each 8K program memory space.

The program memory maps are identical for both DSPA and DSPB. Each 8K program memory space is organized as shown in FIG. 9. Each DSP 200 is supported by 4K of program RAM 201 and 4K of program ROM 202. Addresses 0x0000-0x001F and 0x1000-0x1002 to program RAM 201 are also reserved for accessing interrupt and reset vectors. The remainder of program RAM 201 memory space is available for accessing program instructions. The program ROM 202 memory space is used to store boot, RAM self-test and debug software, as well as application specific tables and microcode.

Figure 7B:
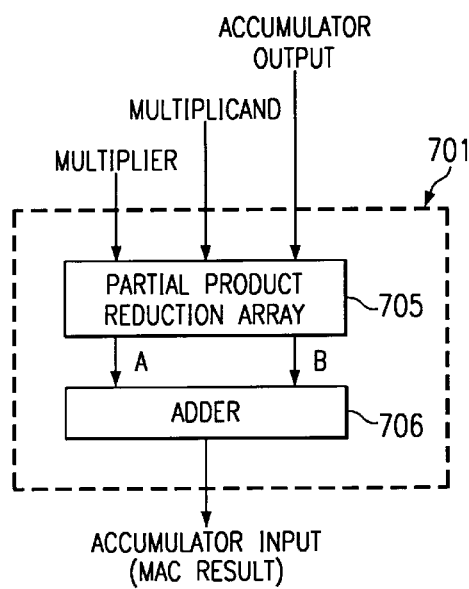
FIG. 7B depicts the overall structure of a multiply-accumulate (MAC) unit within the execution unit of FIG. 7A.
Figure 7C:
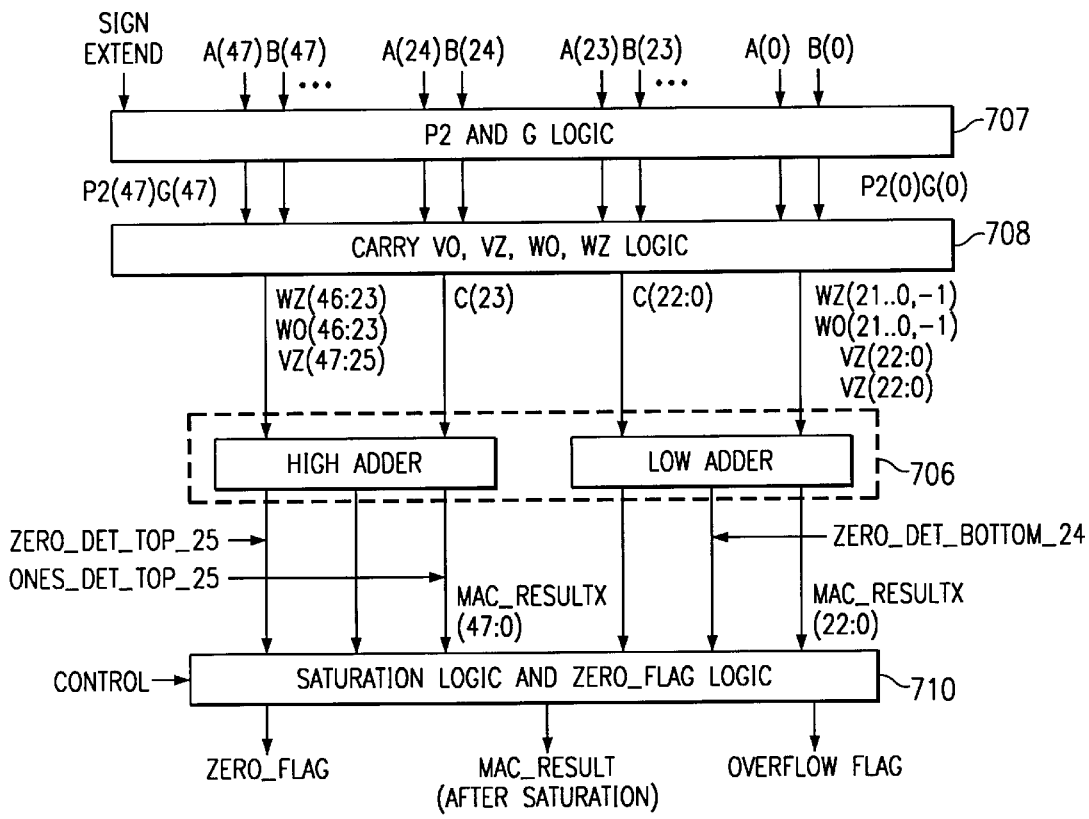
FIG. 7C depicts in detail the adder portion of the MAC unit of FIG. 7B.

FIGS. 7B and 7C are diagrams emphasizing multiply-accumulate (MAC) unit 701 within the execution unit 302 within a selected DSP core 200. In particular FIG. 7B depicts the overall structure of the selected MAC unit, while FIG. 7C depicts in further detail the adder portion. For purposes of the present discussion, the following definitions apply:

$p(I)=a(I) \oplus b(I)$ represents carry propagation;

$g(I)=a(I) \wedge b(I)$ represents carry generation;

$c(I)=c(I) \wedge c(I) \wedge c(I-1) \vee g(I)$ represents carry with $c(o)=0$; and $r(I)=p(I) \oplus c(I-1)$ represents the result of an addition.

According to the principles of the present invention, a method is provided which allows for fast zero detection flag generation and fast saturation of results in MACs 701. As shown in FIG. 7B, each multiply-accumulate unit 701 includes an array 705 which reduces the partial product additions down to two vectors (binary numbers) a and b and an adder 706. FIG. 7C provides additional detail in the form of a functional block diagram. A preferred method of fast zero detection flag generation is described as follows:

Assume that k is a vector of n elements where $k=<k(N-1) \ldots k(0)>$ and that k is the result of the addition of two other vectors a and b. Two new vectors v and w may be generated to aid in the detection of $k=a+b$ which are:

$$v(i)=(p(i) \wedge \overline{k(i)}) \vee g(i)$$

$$w(i)=(p(i+1) \oplus k(1+i))$$

Vector v(I) and w(I) are used to generate a third vector z:

$$z(i)=v(i-1) \oplus w(i-1)$$

Which is bitwise added to get the result flag z.

An alternative and faster method of generating a propagate function is to use (at block 707) the alternative algorithm.

$$p2(i)=a(i) \vee b(i)$$

Normally an OR NOR gate in 1.5 to 3 times faster than a XOR gate. By using this equation (block 707) the addition itself will also get faster. This new term p2 is related to the p(I) as follows:

$$p(i)=p2(i) \wedge \overline{g(i)}$$

Vector v becomes:

$$v(i)=(p2(i) \wedge \overline{g(i)} \wedge \overline{k(i)}) \vee g(i)=(p2(i) \wedge \overline{k(i)}) \vee g(i)$$

Vector w becomes:

$$w(i)=\overline{(g(1+i)} \wedge p2(i+1)) \oplus k(1+i)$$

If a detection for all bits of vector k is zero, then two new vectors vz and wz are generated (block 708):

$$vz(i)=p2(i) \vee g(i)=p2(i)$$
$$wz(i)=\overline{(g(1+i)} \wedge p2(i+1))$$

Alternatively for all of the bits of vector k being one, we generate two new vectors vo and wo:

$$vo(i)=g(i)$$
$$wo(i)=\overline{(g(1+i) \wedge p2(i+1))}$$

Note that our two terms vz and vo are simply p2 and g and 10 that wo are wz are complements of each other. This further simplifies the implementation since these signals can be used to generate signals which can be used to detect zero results and saturation control MAC units 701. Suppose that we have three 24 bit signed numbers x and y and z and we want to support the following functions:

1.) r=x*y+acc−saturate to 48 bits detect 48 bit zero.

2.) r=x*y+acc−saturate to 24 bits detect 24 bit zero

This may be done by noting that a 24 by 24 bit multiply followed by a 48 bit add may produce a result larger than 48 bits. If we desire both long and short precision outputs, results which do not need to be saturated are as follows in Table 11:

TABLE 11

| results | sign | sign extension |
| --- | --- | --- |
| 48 bit MAC result | 48th bit = 1 | bits past 48th all ones |
| 48 bit MAC result | 48th bit = 0 | bits past 48th all zero |
| 24 bit MAC result | 24th bit = 1 | 24th through 48th all ones |
| 24 bit MAC result | 24th bit = 0 | 24th through 48th all zero |

The zero detect functions are shown in Table 11:

TABLE 11

| result desired | sign extension |
| --- | --- |
| 48 bit MAC zero | lower 24 are zero and 24th bit and upper 24 are zero |
| 24 bit MAC zero | lower 24 are zero |

Note that the first entry in the above table contains a redundancy, i.e., the 24th bit is counted twice. This allows the same function to be used for both zero detection and saturation control.

A fast zero detection flag generation in any arithmetic—logic unit or similar circuitry, especially those intended for use in high speed systems. In particular, these principles can be advantageously applied in stream data processing systems, such as the audio decoder discussed above.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of generating a zero detect flag at the output of an adder adding a first vector a(i) and a second vector b(i) to gerprate a third vector k(i), which is a sum of said first and second vectors wherein i is an integer between 0 and n-1 indicating a bit number and n is the number of bits in the vector, the method comprising the steps of:

generating a fourth vector v(i) vector in accordance with the formula:

$$v(i)=(p(i) \wedge \overline{k(i)}) \vee g(i);$$

wherein p(i) is the carry propagation vector $p(i)=a(i) \oplus b(i)$, and g(i) is the carry generation vector $a(i) \wedge b(i)$;

generating a fifth vector w(i) in accordance with the formula:

$$w(i)=(p(i+1)\oplus k(1+i);$$

generating a sixth vector z(i) in accordance with the formula:

$$z(i)=v(i-1)\oplus w(i-1);$$

and adding bits of vector z(i) together bit by bit to obtain a zero detection flag z.

2. The method of claim 1 wherein said steps of generating and adding are performed in logic.

3. The method of claim 2 wherein the logic comprises a portion of a multiply-accumulate unit.

4. The method of claim 3 wherein the multiply-accumulate unit forms a part of an audio data processing system.

5. A method for generating a carry propagation function in response to the received vectors a(i) and b(i), where i is an integer between 0 and n-1 indicating a bit number and n is the number of bits in the vector, the method comprising the steps of:

generating a vector p2(i) in accordance with the formula:

$$p2(i)=a(i)\wedge b(i);$$

generating a vector v(i) in accordance with the formula:

$v(i)=p2(i)\wedge \overline{k(i)}\vee g(i)$ where $k(i)=a(i)+b(i)$ is the sum of vectors $a(i)+b(i)$ and $g(i)$ is a carry generation vector, $g(i)=a(i)\wedge b(i)$;

generating a vector w(i) in accordance with the formula:

$$w(i)=\overline{g(1+i)}\wedge p2(i+1)\oplus k(1+i);$$

generating a zero detection vector in accordance with the formula:

$$z(i)=v(i-1)\oplus w(i-1);$$

adding the bits of vector z(i) together bit by bit to obtain a zero detection result z for vector k(i);

if the detection result is a zero, performing the substeps of:

generating a vector VZ in accordance with the formula:

$$vz(i)=2p(i)\wedge g(i)=p2(i);$$

and generating a vector wz(i) in accordance with the formula:

$$wz(i)=\overline{g(1+i)}\wedge p2(i1);$$

and if the detection result is a one, performing the substeps of:

generating a vector v0(i) in accordance with the formula:

$$v0(i)=g(i);$$

and generating a vector w0(i) in accordance with the formula:

$$w0(i)=\overline{g(1+i)}\wedge p2(i+1).$$

6. The method of claim 5 wherein the propagation function is generated within a multiply-accumulate unit.

7. The method of claim 6 wherein the multiply-accumulate unit comprises a portion of a digital signal processor.

8. The method of claim 7 wherein the digital signal processor comprises a portion of an audio decoder.

\* \* \* \* \*